Nov. 17, 1942.   W. H. SICKINGER   2,302,268
INTERIOR COOKER CONSTRUCTION FOR COOKING RANGES
Filed Feb. 2, 1940    2 Sheets—Sheet 1

INVENTOR.
WILLIAM H. SICKINGER.
BY Oltsch & Knoblock
ATTORNEYS.

Nov. 17, 1942.  W. H. SICKINGER  2,302,268
INTERIOR COOKER CONSTRUCTION FOR COOKING RANGES
Filed Feb. 2, 1940  2 Sheets-Sheet 2
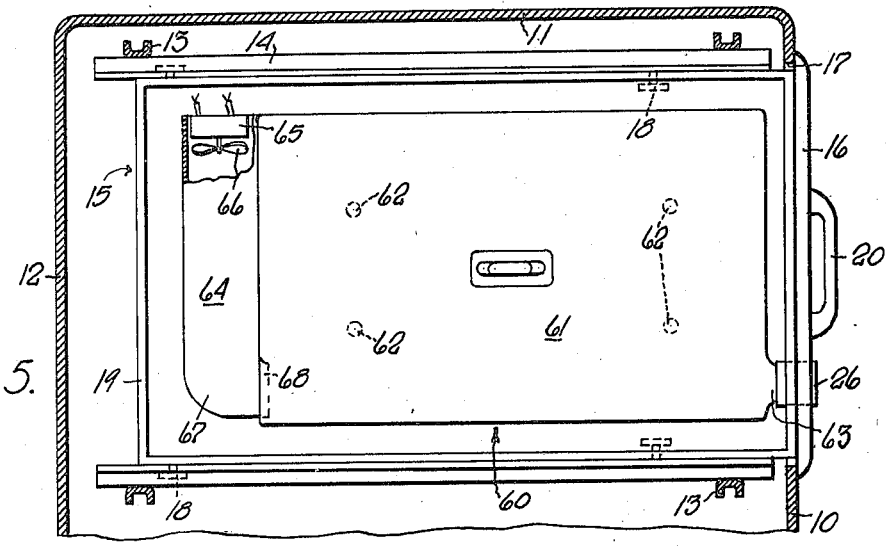
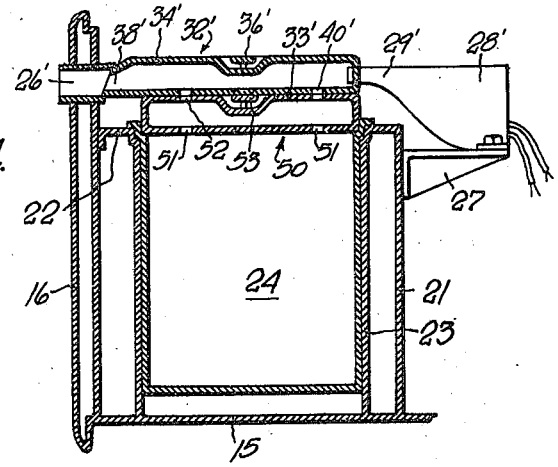
INVENTOR.
WILLIAM H. SICKINGER.
BY
Oltsch & Knoblock
ATTORNEYS.

Patented Nov. 17, 1942

2,302,268

UNITED STATES PATENT OFFICE 2,302,268

INTERIOR COOKER CONSTRUCTION FOR COOKING RANGES

William H. Sickinger, South Bend, Ind., assignor to The Malleable Steel Range Manufacturing Company, South Bend, Ind., a corporation of Indiana Application February 2, 1940, Serial No. 316,919

12 Claims. (Cl. 126—21)

This invention relates to improvements in interior cooker constructions for cooking ranges, and more particularly to a construction which permits a cooker unit to be mounted interiorly with respect to the cabinet of a cooking range, such as an electric range. Heretofore it has been conventional in range construction, and particularly in electric range construction, to mount cooker units in the top of the range cabinet, rather than entirely within the confines of the cabinet. This has been necessary by reason of the fact that steam is exhausted during the operation of a cooker unit, and where the unit is mounted at the top of cabinet the steam exhausts to atmosphere. However, in an interiorly mounted cooker unit no such exhaust to atmosphere is possible, and consequently the steam will collect within the range cabinet and condense, thereby causing rusting of the range cabinet and dripping of moisture from the cabinet.

It is the primary object of this invention to provide a cooking range having a cooker unit mounted interiorly thereof and provided with means for venting and exhausting moisture generated in the cooker unit.

A further object is to provide a cooker unit positioned within a range cabinet with a moisture receiver having a vent open to atmosphere, and means for creating an air current in the receiver exhausting at the vent.

A further object is to provide an interiorly mounted cooker unit with an atmospheric vent and a fan for directing air currents over the cooker and through the vent to entrain and exhaust moisture generated by the cooker.

A further object is to provide a device of this character wherein a cooker is mounted in a drawer of a range cabinet and is provided with moisture exhausting means thereover, which means are readily detachable to accommodate access to the cooker unit.

Other objects will be apparent from the description and appended claims.

In the drawings:

Fig. 4 is a fragmentary vertical sectional view similar to Fig. 2 and illustrating a modified arrangement of moisture venting means with respect to a cooker unit.

Fig. 5 is a fragmentary horizontal sectional view of a range cabinet illustrating in top elevation a cabinet drawer structure and cooker unit mounted therein and provided with a modified embodiment of moisture venting means which is shown partly in section.

Figure 1:
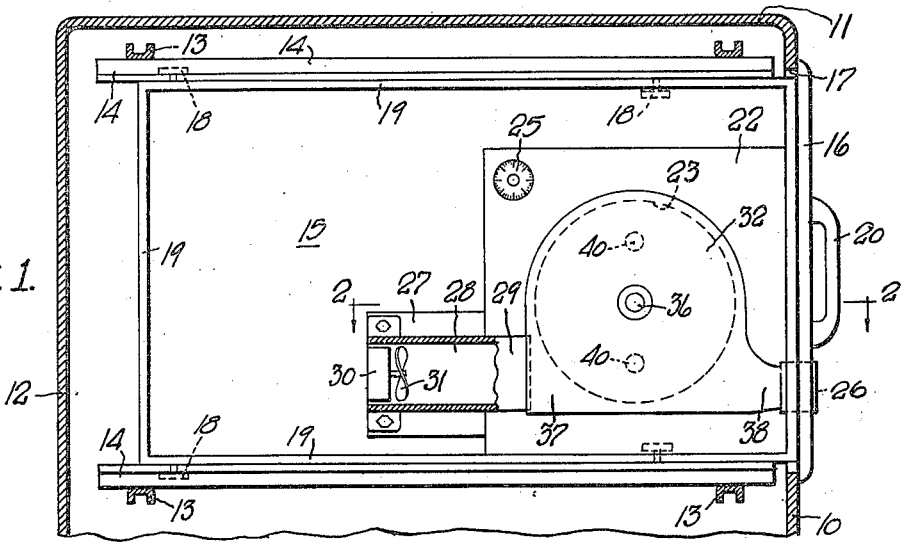
Fig. 1 is a horizontal sectional view of a range cabinet illustrating in top elevation, a cabinet drawer and a cooker with my improved moisture venting means applied thereto and illustrated partly in section.
Figure 2:
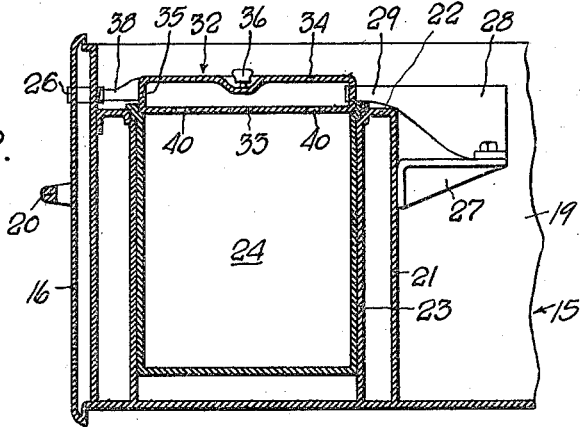
Fig. 2 is a vertical fragmentary sectional view taken on line 2—2 of Fig. 1, and illustrating the relation of the cooker and venting means within a stove drawer.
Figure 3:
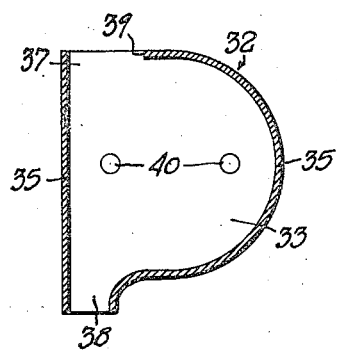
Fig. 3 is a horizontal transverse sectional view of a detail of my improved device.

Referring to the drawings, and particularly to Figs. 1 to 3, the numeral 10 designates the front wall, 11 a side wall and 12 a rear wall of the cabinet of a cooking range, such as an electric range. Within this range cabinet are mounted uprights 13 which carry guides 14 for a range drawer projecting outwardly of the range through cabinet opening 17, and having a front 16 exteriorly of the range cabinet. The stove drawer 15 is provided with suitable means, such as rollers 18, for slidable mounting of the drawer 15 with respect to the guides 14. The drawer 15 is provided with the usual vertical walls 19 and with a handle 20.

A cooker unit is mounted within the cabinet, said unit comprising a housing having an outer wall 21, a cover 22 and an inner wall 23, said walls defining a substantially annular chamber within which suitable heating elements (not shown) may be mounted. Any suitable cooking vessel 24 may be mounted within the cooker housing, and the cooker unit is provided with the usual control 25.

At the drawer front 16, above the cover 22 of the cooker housing, which housing is preferably of a height less than the height of the walls 19 of the drawer, is mounted an open ended vent or passage member 26. At the rear of the cooker housing is mounted a bracket 27 which supports a hood or duct 28 extending forwardly in a tapered reduced dimension portion 29 providing a neck or nozzle portion terminating adjacent the inner wall 23 of the cooker housing at one side of the center thereof. A suitable electric motor 30, such as an electric clock motor, is mounted at the large dimension portion of hood 28 and mounts a fan 31. Both ends of the hood 28 are open.

A cover 32 fits over the vessel 24, said cover being hollow and having bottom wall 33, top wall 34 and vertical marginal walls 35. The cover 32 may be provided with a suitable handle 36 at its center. The shape of the bottom 33 of the cover unit is preferably circular to fit snugly within the top of the vessel 24, and is provided with a right angled projection 37 at its rear portion, and with a restricted neck outlet 38 at its front portion. The restricted outlet 38 is adapted to fit loosely within the rear end of the passage or vent member 26, and the rear vertical wall of rectangular portion 37 is provided with an opening 39 through which the neck 29 of hood 28 may project. The bottom wall 33 of the cover 32 is provided with one or more openings 40.

It will be seen from the above that when the cooker unit mounted within the drawer 15 as aforesaid is to be used, the cover 32 is first properly applied thereto. For this purpose, the fitting of hood portion 29 within cover portion 39 and of cover projection 38 within vent 26 is sufficiently loose to permit ready application and removal of the cover 32 to the vessel 24 without disturbing the parts. It will be understood, of course, that a butt joint may be utilized between the cover and the vent and duct, if desired. When the control 25 of the cooker is energized, the motor 30 is also started to drive the fan 31. Fan 31 operates at low speed to create a gentle current of air. If desired, the motor 30 may be connected to the control 25 for actuation of the motor simultaneously with the cooker. Hence, as steam is generated within the vessel 24 and exhausts through the openings 40 into the cover 32, said steam comes within the range of influence of the air currents generated by fan 31 and passing through hood 28 into the interior of the cover 32, and is entrained by said air currents and carried out through neck 38 and vent 26 for exhaust to atmosphere.

The rate of speed at which the fan 31 operates need be only such as to create a sufficient air circulation as to entrain all steam exhausted through openings 40 and to carry the same outwardly to atmosphere to vent 26. In this way no moisture is retained within the cover 32 and no moisture is permitted to remain within the range cabinet or within the drawer, and hence all possibility of condensation of the moisture within the cabinet, with resultant danger of rust or of leakage from the cabinet, is avoided.

The vent member 26 may be of any construction which will harmonize with the appearance of the range cabinet. The use of the bracket 27 for mounting the hood 28 and the motor 30 makes this portion of the unit sturdy and readily useable without possibility of damage thereto incident to opening and closing of the range drawer.

A slightly modified form of device is illustrated in Fig. 4, wherein the drawer 15 mounts the cooker casing and vessel as aforesaid, the respective parts bearing the same designations as in the preferred embodiment. The difference between this construction and that previously described is that a regular hollow cover 50 is mounted on the vessel 24 of the cooker. Cover 50 has openings 51 in its bottom wall and 52 in its top wall, and is otherwise entirely closed. The handle 53 of the cover 50 is inset at the top wall thereof with its upper surface substantially flush with the upper surface of the top of the cover 50. The moisture collecting member 32' is mounted over the cover 50 and corresponds in substantially all respects with the member 32 hereinbefore described. In this connection the cover 32' has a lower wall 33' provided with openings 40' which register with openings 52 of the cover 50, and it has a top wall 34' mounting a handle 36', together with a projection 38' adapted to fit within a vent 26' and an opening similar to opening 39 of the preferred embodiment to receive the neck 29' of the hood 28'. The operation of this embodiment is the same in all respects as in the preferred embodiment with the exception that the moisture must pass entirely through the cover 50 to enter the moisture collector 32'. In this embodiment it may be necessary to operate the fan within the hood 28' at a higher speed than in the preferred embodiment in order to create a sufficient velocity of air to insure the passage of all steam from the cooker vessel 24 through the cover 50 into the collector 32'.

This embodiment of the invention is primarily intended for application to drawer mounted cookers which were not originally provided with venting means.

The Fig. 5 embodiment of the invention illustrates the application of the venting means to a cooker unit 60 of substantially rectangular form, and of a size utilizing substantially all of the space within the drawer 15. In this embodiment, the cover 61 of the cooker is of the hollow formation heretofore illustrated, having its bottom wall provided with opening 62 for receiving moisture generated within the cooker vessel. A vent 26 passes through the range drawer front 16 as in the preferred embodiment, and the cover 61 has a neck outlet 63 projecting therefrom to fit loosely within the rear of vent 26. The rear end of the cooker mounts a hood 64 extending transversely of the drawer, and receiving the motor 65 and the fan 66 therein adjacent its intake end. Hood 64 is bent at its opposite end 67 and is provided with a projection 68 adapted to fit loosely within a suitable opening in the rear of the cover.

The operation of this embodiment of the invention is the same as the operation of the preferred embodiment, it being observed, however, that the direction of air travel initiated by the fan 66 is transverse of the drawer end and is thence directed forwardly through the projection 68 and into the cooker cover 61 by the curved portion 67 of the hood 64. The air circulation in this instance may be greater than that in the preferred embodiment, in order to take care of the greater amount of moisture that is generated within the larger cooker 60. The joints between the cover 61 and the hood 64 and vent 26 respectively, are loose to permit manipulation of the cover and application and removal thereof to the cooker, or may be of the butt type, as will be obvious.

While the invention is herein illustrated and described in relation to a cooker mounted in a sliding drawer, it will be understood that it may also be utilized with cookers mounted in other relations within a range cabinet.

I claim:

1. The combination with a cooking range having a cabinet, of a cooker unit within said cabinet, a hollow member communicating with said unit, a vent extending laterally through said cabinet and communicating with said hollow member, and means for generating and passing a current of air through said hollow member for exhaust through said vent.

2. The combination defined in claim 1, wherein said hollow member is removably mounted on the top of said unit and is detachably associated with said vent and last named means.

3. The combination with a cooking range having a cabinet, of a cooker unit within said cabinet, a vent in said cabinet, air circulating means carried by said cooker unit spaced from said vent and including a fan, and a hollow cover for said unit having openings therein communicating with said unit, said air circulating means, and said vent.

4. The combination with a cooking range having a cabinet and a drawer slidable in said cabinet, of a cooker unit within said drawer, a vent in said drawer open to atmosphere, a hollow cover for said unit having openings communicating with said unit and said vent, and means for generating and directing a current of air through said cover for exhaust through said vent.

5. The combination with a cooking range having a cabinet, of a cooker within said cabinet, means for collecting moisture generated in said cooker, and means associated with said collecting means for generating and circulating an air current in said collecting means and exhausting said air current to atmosphere.

6. The combination defined in claim 5, wherein said moisture collecting means constitutes a cover removably mounted on said cooker and detachably connected with said air circulating means.

7. The combination with a cooking range having a cabinet provided with a vent, of a cooker within said cabinet adjacent said vent, a hollow cover for said cooker having an opening communicating with said cooker, said cover having an open ended projection juxtaposed to and communicating with said vent, and means for generating and directing a current of air through said cover, projection and vent.

8. The combination with a cooking range having a cabinet, of a cooker within said cabinet, a hollow member communicating with said cooker for collecting moisture generated in said cooker, a fan adjacent said cooker, and means for directing air from said fan to atmosphere, said hollow member being interposed in said air directing means.

9. The combination defined in claim 8, wherein said hollow member is detachably connected with said air directing means and removable from said cooker.

10. The combination with a cooking range having a cabinet, of a cooker within said cabinet, a hollow member positioned over said cooker and communicating therewith, a pair of ducts positioned on opposite sides of said member, one of said ducts being open to atmosphere, and air circulating means associated with the other duct, said member having openings communicating with said ducts.

11. The combination with a cooking range having a cabinet, of a cooker within said cabinet, a hollow member positioned over said cooker and communicating therewith, a fan within said cabinet and adjacent said cooker, an open ended duct receiving said fan and having a restricted portion communicating with said member, and means for venting said member to atmosphere.

12. The combination with a cooking range having a cabinet, a cooker within said cabinet and including a housing and a cooking vessel therein, a support carried by said housing, a fan carried by said support, an open ended duct on said support receiving said fan, a hollow member positioned over said cooking vessel, said member having an opening therein communicating with said vessel and an opening communicating with said duct, a substantially horizontal vent in said cabinet opposite said duct, and means establishing communication between said member and said vent.

WILLIAM H. SICKINGER.